No. 757,246. PATENTED APR. 12, 1904.
H. E. ABLETT.
DRAWING AND DESIGNING APPARATUS.
APPLICATION FILED FEB. 16, 1903.
NO MODEL. 2 SHEETS—SHEET 1.
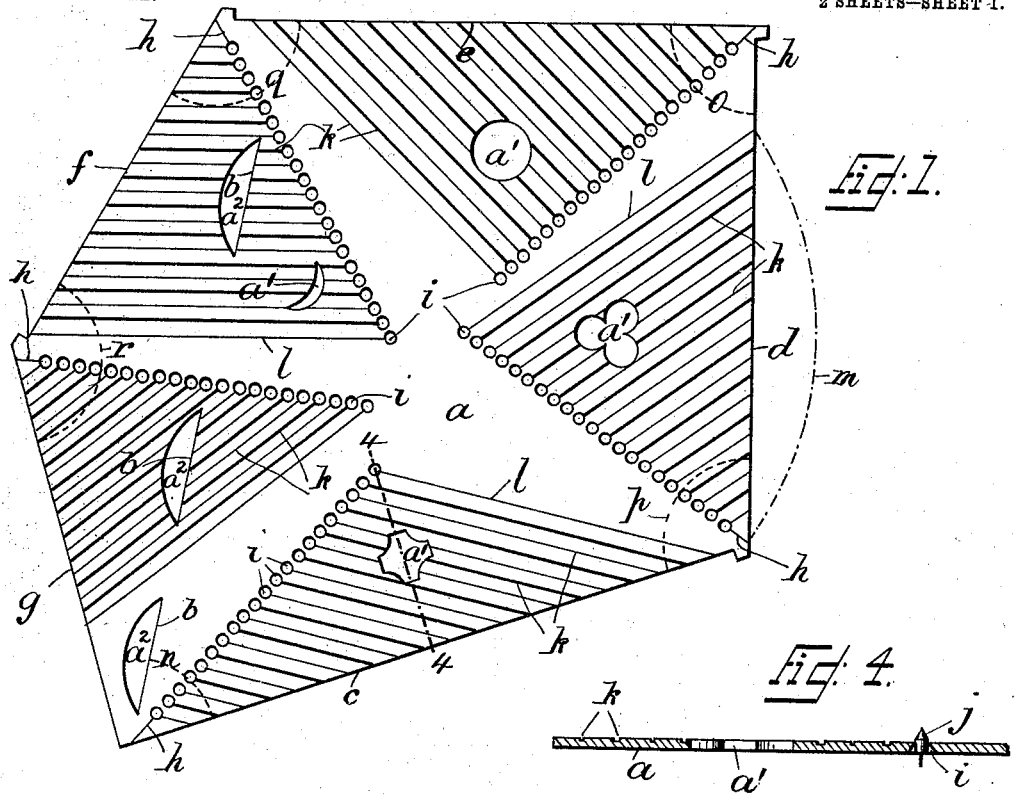
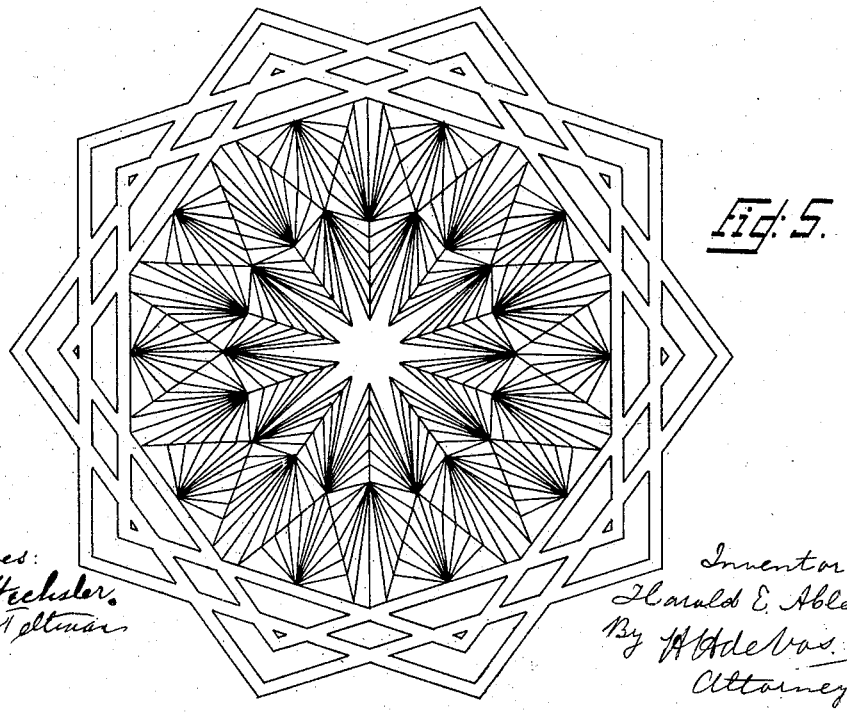
Witnesses:
Helen Wechsler
Lunella Feltman
Inventor:
Harald E. Ablett,
By H. A. de Vos.
Attorney No. 757,246. PATENTED APR. 12, 1904.
H. E. ABLETT.
DRAWING AND DESIGNING APPARATUS.
APPLICATION FILED FEB. 16, 1903.
NO MODEL. 2 SHEETS—SHEET 2.
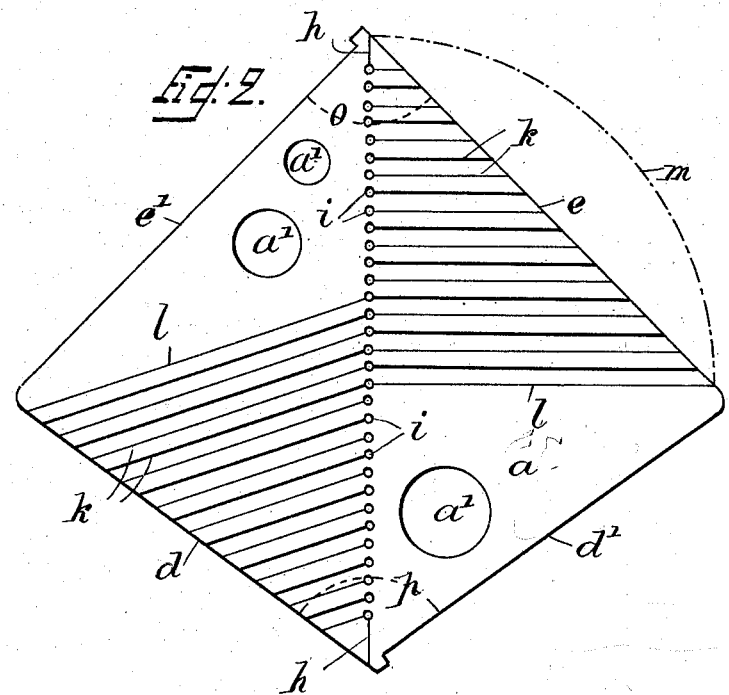
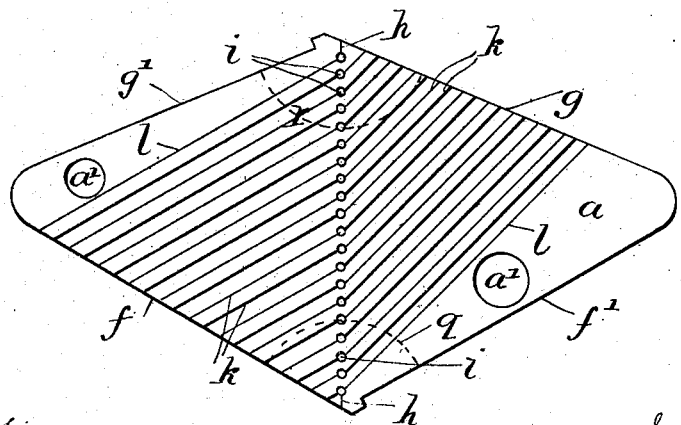

No. 757,246. Patented April 12, 1904.

UNITED STATES PATENT OFFICE.

HAROLD EDMUND ABLETT, OF LONDON, ENGLAND.

DRAWING AND DESIGNING APPARATUS.

SPECIFICATION forming part of Letters Patent No. 757,246, dated April 12, 1904.

Application filed February 16, 1903. Serial No. 143,506. (No model.)

*To all whom it may concern:*

Be it known that I, HAROLD EDMUND ABLETT, a subject of the King of Great Britain and Ireland, and a resident of London, England, have invented certain new and useful Improvements in Drawing and Designing Apparatus; and I do hereby declare the following to be a full, clear, and exact description of the same.

This invention relates to drawing or designing apparatus especially serviceable in drawing, plotting, or setting out geometrical polygonal figures and the like and enabling the same to be done without the aid of compasses, rulers, or measuring appliances and being serviceable as well to children in kindergarten exercises and to students in learning the composition of geometrical figures as to draftsmen, architects, designers, and others in the development or plotting out of such figures or of geometrical designs generally or of drawings in which such figures enter into the composition.

On the accompanying drawings, Figure 1 represents a face view of the device. Figs. 2 and 3 represent modifications. Fig. 4 is an enlarged section on 4 4, Fig. 1, and shows a centering-pin used with the device. Fig. 5 represents a figure produced by the device.

The improved apparatus consists of a disklike instrument $a$, made of an irregular polygonal formation, with each pair $b\ c$, $c\ d$, $d\ e$, $e\ f$, $f\ g$ or $d\ d'$, $e\ e'$, $f\ f'$, $g\ g'$ of its adjacent sides constituting an external angle, respectively, in conformity with the internal angle of the polygon which can be drawn therewith and with its series of adjacent external angles constituting an aggregation of the angles of the polygons which can be drawn therewith. Each such external angle of the disk is bisected by a line $h$, which constitutes the radius of the describing circle $m$ of the largest polygon which can be drawn thereby. Each such radius is divided off into preferably equal parts, as many in number as that of the sizes of like polygons desired to be drawn thereby, the disk being pierced at such divided-off parts of each such radius-line with holes $i$, which are adapted to serve as centers for engagement with a center-pin $j$, Fig. 4, inserted into a drawing-board or the like, so as to determine the size of the polygon to be drawn.

The face of the disk is scored or incised with grooves $k$, drawn from such respective center holes $i$ to one edge of the relative external angle parallel with a base or longest radius groove $l$, which joins the center of the largest describing arc $m$ with the point in such edge intersected by such arc, which enables the ends of the polygon sides of the sizes corresponding to said respective center holes to be readily determined, the arrangement being such that the center holes $i$ in the bisecting radius $h$ respectively serve to determine the center of the circumscribing circle of the polygon desired to be drawn, the outer end of the corresponding radius-groove $k$ serves to determine the length of the side of the polygon, the edge or side of the external angle to which such groove proceeds serves as a guide to the drawing-pencil, and the other edge or side of such angle serves on adjustment against the last-drawn line of the polygon to determine the position of the next line thereof to be drawn.

The holes $i$ are countersunk on the under side of the disk to facilitate engagement with the center-pin, and the radius-grooves $k$ are incised in the face of the disk alternatively broad and narrow to facilitate determination by the eye of the line end appropriate to the respective center and are scored sufficiently deeply to serve as guides to a pencil-point run along the grooves to the angle side termination thereof. The disk is further pierced with stencil-openings $a'$ of different patterns, adapted both to enable any parts of the areas of polygons produced by the disk to be filled in with repeated or different designs and to serve as convenient means of shifting the disk on the board and holding it in angular relation thereto.

The center-pin $j$ is preferably formed with a taper head adapted to coact with the countersunk under sides of the disk-holes $i$ when placed in engagement therewith to quickly aid truly centering the device, and it has an under needle-like point for entering the drawing paper and board. Said external angles may be arranged in any desired order around the periphery of the disk, and the guide line or edge of one or more of such angles—as, for example, the edge $b$—may be cut through the plate when the sides of two adjacent angles—as, for example, the sides $b$ $g$—are not coincident, and the openings $a^2$ so formed will serve to facilitate the manipulation of the disk on the board.

As represented, the angle $n$ is suitable for the drawing of a trigon, the angle $o$ for a square, the angle $p$ for a pentagon, the angle $q$ for a hexagon, and the angle $r$ for an octagon, these being the primary polygons which can be directly drawn by the device represented.

In the modification represented in Fig. 2 the angle $o$ is suitable for the drawing of a square and the angle $p$ for a pentagon, and in that represented in Fig. 3 the angle $q$ is suitable for drawing a hexagon and the angle $r$ for an octagon. In each of these modifications the angle-bisecting lines $h$ of holes $i$ are made coincident.

The disk $a$ enables a great multiplicity of geometrical and other figures (of which one is given, by way of example, in Fig. 5) to be readily and regularly formed without the aid of compasses, rulers, or measuring instruments and by the amateur as well as the expert, due judgment being excercised and care taken.

The disk may be made for left-handed use, Fig. 1, or for right-handed use, Figs. 2 and 3.

What I claim as my invention, and desire to secure by Letters Patent, is—

A device for drawing plotting or setting out geometrical polygonal figures and the like consisting of a disk-like instrument made of an irregular polygonal formation with each angle-forming pair of its adjacent sides constituting an external angle of the polygon which can be drawn thereby, and with each such external angle bisected by a line adapted to serve as the radius of the describing arc of the largest polygon which can be drawn by such angle, the angle subtended by such arc being included between said radius and a similar radius incised or grooved in the surface of the disk, each such bisecting-line being divided and pierced with a plurality of holes adapted to act as centers for the describing arcs of the different-sized polygons which can be drawn by the angle such line bisects, such holes being countersunk on the under side and adapted to engage with a centering-pin, and the parts of the disk included between said radii of each such largest describing arc being divided by grooves incised in the surface of the disk and running from the center holes of such bisecting radius parallel with said incised or grooved radius of said arc to the chord of such arc, and serving to determine the lengths of the sides of the polygons appropriate to the respective center holes, said grooves being incised in the face of the disk and made alternately wide and narrow as a ready guide for the eye and adapted to guide a pencil slid therealong, and the disk being pierced with geometrical openings adapted to serve as stencils and as means by which the disk can be held at an inclination to the paper or board and easily shifted about its centering-pin, as set forth.

In testimony whereof I have signed this specification in the presence of two subscribing witnesses.

HAROLD EDMUND ABLETT.

Witnesses:
ALFRED CHARLES DAY,
ARTHUR WALTER DAY.